US008549618B2

(12) United States Patent
Chang

(10) Patent No.: US 8,549,618 B2
(45) Date of Patent: Oct. 1, 2013

(54) CLIENT COMPUTER, REMOTE CONTROL SYSTEM, AND REMOTE CONTROL METHOD

(75) Inventor: Jeom-jin Chang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1352 days.

(21) Appl. No.: 11/697,895

(22) Filed: Apr. 9, 2007

(65) Prior Publication Data

US 2008/0040786 A1 Feb. 14, 2008

(30) Foreign Application Priority Data

Aug. 14, 2006 (KR) .................. 10-2006-0076878

(51) Int. Cl.
*G06F 21/00* (2013.01)
(52) U.S. Cl.
USPC ............. 726/16; 726/17; 726/21; 726/4
(58) Field of Classification Search
USPC ................................ 726/4, 16, 17, 21
See application file for complete search history.

(56) References Cited

U.S. PATENT DOCUMENTS

| 5,301,227 A * | 4/1994 | Kamei et al. ............... 379/88.03 |
| 5,497,479 A | 3/1996 | Hornbuckle |
| 5,537,544 A * | 7/1996 | Morisawa et al. ............... 726/19 |
| 5,909,589 A * | 6/1999 | Parker et al. ..................... 712/32 |
| 6,735,696 B1 * | 5/2004 | Hannah ............................ 713/189 |
| 7,224,801 B2 * | 5/2007 | Abdo et al. ..................... 380/270 |
| 7,758,428 B2 * | 7/2010 | Mattice et al. .................. 463/46 |
| 2002/0142831 A1 * | 10/2002 | Mattice et al. .................. 463/29 |
| 2005/0003799 A1 | 1/2005 | Kang |
| 2006/0234679 A1 * | 10/2006 | Matsumoto et al. ........... 455/411 |

FOREIGN PATENT DOCUMENTS

| CN | 1407787 A | 4/2003 |
| CN | 1578520 A | 2/2005 |
| CN | 1599320 A | 3/2005 |
| JP | 2000-172388 | 6/2000 |
| KR | 2003-84473 | 11/2003 |
| KR | 2004-86137 | 10/2004 |
| KR | 10-2006-0070995 A | 6/2006 |
| KR | 10-2006-0078885 A | 7/2006 |

\* cited by examiner

*Primary Examiner* — Jeffrey Pwu
*Assistant Examiner* — Helai Salehi
(74) *Attorney, Agent, or Firm* — Jefferson IP Law, LLP

(57) ABSTRACT

A client computer that is connectable to a host computer by a network, includes a communication part to communicate with the host computer; a user input part; a system part to perform a function depending on an application; and a controller to control the system part to be put into a locking state to stop performing operations input by a user from the user input part if a locking signal is received from the host computer through the communication part, and to control the communication part to unlock the locking state if an unlocking signal is received from the host computer through the communication part.

17 Claims, 5 Drawing Sheets

CLIENT COMPUTER, REMOTE CONTROL SYSTEM, AND REMOTE CONTROL METHOD

CROSS-REFERENCE TO RELATED APPLICATIONS

This application claims the benefit of Korean Patent Application No. 2006-76878 filed on Aug. 14, 2006 in the Korean Intellectual Property Office, the disclosure of which is incorporated herein by reference.

BACKGROUND OF THE INVENTION

1. Field of the Invention

Aspects of the present invention relates to a client computer, a remote control system, and a remote control method, and more particularly, to a client computer, which can be controlled by being connected to a host computer through a network, and systems and methods therefor.

2. Description of the Related Art

Generally, a network, a plurality of computers and other apparatuses physically connected to each other so that equipment and information can be shared, is classified into a LAN (Local Area Network), a MAN (Metropolitan Area Network), a WAN (Wide Area Network), etc., according to the distance between the devices on the network. Further, the network is classified into a TCP/IP (Transmission Control Protocol/Internet Protocol) network, a SNA (System Network Architecture) network, etc., according to a data-transmitting format. Networks are generally located in various computer rooms in companies, public agencies, educational institutes, and other organizations. The network may be connectable to other networks and may include related sub-networks.

As computing environments have changed from a centralized (mainframe) environment to a client-server environment, the number of local servers and communication equipment has increased. The local servers and communication equipment needs to be monitored for various reasons, such as errors occurring in software and hardware. Since there are more local servers and communication equipment, monitoring and controlling the local servers and the communication equipment becomes more complicated. Accordingly, remote control systems have been developed and used to efficiently monitor and control a client computer system that is physically separated from a corresponding local server but is connected to the local sever by the network.

A conventional remote control system connects a control system, which can be a host computer or a server, to a plurality of client computers through a network to perform functions like power cycle management, system asset management, system management, update management, bug recovery management, etc., by using an ASF (Alert Standard Format) technology, an Intel®AMT (Active Management Technology)™, or other technologies.

The control system and the client system are authenticated by using a password stored in a LAN controller or the client system. Accordingly, if (for example) the password stored in the LAN controller or the client system is illegally hacked or disclosed, the client system can be accessed and abused from anywhere.

SUMMARY OF THE INVENTION

Accordingly, it is an aspect of the present invention to provide a client computer connected to a corresponding host computer by a network, which can prevent a corresponding client system from being abused by a hacked or disclosed password by limiting operation of the client system as necessary, to thereby prevent precious information and data from being leaked.

It is another aspect of the present invention to provide a remote control system having the host computer and the client computer that are connected to each other by the network.

Further, it is another aspect of the present invention to provide a remote control method for the remote control system.

Accordingly, an unauthorized user and an authorized user, respectively can be prevented from accessing or be permitted to access to the client computer by transmitting a locking signal, an unlocking signal, and a password generated in the host computer to the client computer.

Additional aspects and/or advantages of the present invention will be set forth in part in the description which follows and, in part, will be obvious from the description, or may be learned by practice of the present invention.

The foregoing and/or other aspects of the present invention may be achieved by providing a client computer that is connectable to a host computer by a network, comprising: a communication part to communicate with the host computer; a system part to perform operations depending on an application; and a controller to put the system part into a locking state if a locking signal is received from the host computer through the communication part, and to control the communication part to end the locking state if an unlocking signal is received from the host computer through the communication part; wherein the system does not perform operations in response to user input while the system part is in the locking state.

According to another aspect of the present invention, the client computer further comprises a storing part to store passwords received by the client computer; wherein the controller checks whether the locking signal comprises a first password if the locking signal is received, and controls the storing part to store the first password if the locking signal comprises the first password, and checks whether the unlocking signal comprises a second password if the unlocking signal is received, compares the second password with the first password if the unlocking signal comprises the second password, and releases the system part from the locking state if the second password is identical to the first password.

According to another aspect of the present invention, the client computer further comprises a power supplying part to supply power to the system part; wherein the controller controls the power supplying part to stop supplying power to the system part if the locking signal is received.

According to another aspect of the present invention, the controller informs a user that the system part is in the locking state if the user input is received through the user input part while the system part is in the locking state.

According to another aspect of the present invention, the client computer further comprises a display part; wherein the controller displays information on the display part corresponding to an informing signal to inform the user that the system part is put under the locking state on the display part.

The foregoing and/or other aspects of the present invention are also achieved by providing a remote control system, comprising: a client computer to be put into a locking state if a locking signal is received from an outside, and to be released from the locking state if an unlocking signal is received from the outside, and a host computer to transmit the locking signal and the unlocking signal to the client computer; wherein the client computer does not perform functions input by a user while the client computer is in the locking state.

According to another aspect of the present invention, the host computer transmits the locking signal comprising a first password and the unlocking signal comprising a second password to the client computer; and the client computer checks whether the locking signal comprises the first password if the locking signal is received and stores the received first password if the locking signal comprises the first password; and checks whether the unlocking signal comprises the second password if the unlocking signal is received, compares the second password with the first password if the unlocking signal comprises the second password, and ends the locking state if the second password is identical to the first password.

According to another aspect of the present invention, the client computer stops performing a function corresponding to a power supplying signal if the power supplying signal is received while the client computer is in the locking state.

According to another aspect of the present invention, the client computer informs a user that the client computer is in the locking state if a user input is received from the user while the client computer is in the locking state.

According to another aspect of the present invention, the client computer displays information corresponding to an informing signal on a display part to inform the user that the client computer is in the locking state.

The foregoing and/or other aspects of the present invention are also achieved by providing a remote control method of a host computer and a client computer, comprising: receiving a locking signal from the host computer; putting the client computer into a locking state wherein the client computer does not perform operations input by a user if the locking signal is received; checking whether an unlocking signal is received from the host computer; and ending the locking state of the client computer if the client computer receives the unlocking signal.

According to another aspect of the present invention, the remote control method further comprises generating a first password and transmitting the locking signal comprising the first password to the client computer; checking whether the locking signal comprises the first password and storing the received first password; generating a second password and transmitting the unlocking signal comprising the second password to the client computer; checking whether the unlocking signal comprises the second password and comparing the second password with the stored first password; and ending the locking state if the second password is identical to the stored first password.

According to another aspect of the present invention, the remote control method further comprises ceasing an operation corresponding to a power supply signal if the power supply signal is received from the user while the client computer is put under the locking state.

According to another aspect of the present invention, the remote control method further comprises allowing the client computer to inform the user that the client computer is put under the locking state if a predetermined user input is received from the user while the client computer is in the locking state.

Additional aspects and/or advantages of the invention will be set forth in part in the description which follows and, in part, will be obvious from the description, or may be learned by practice of the invention

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
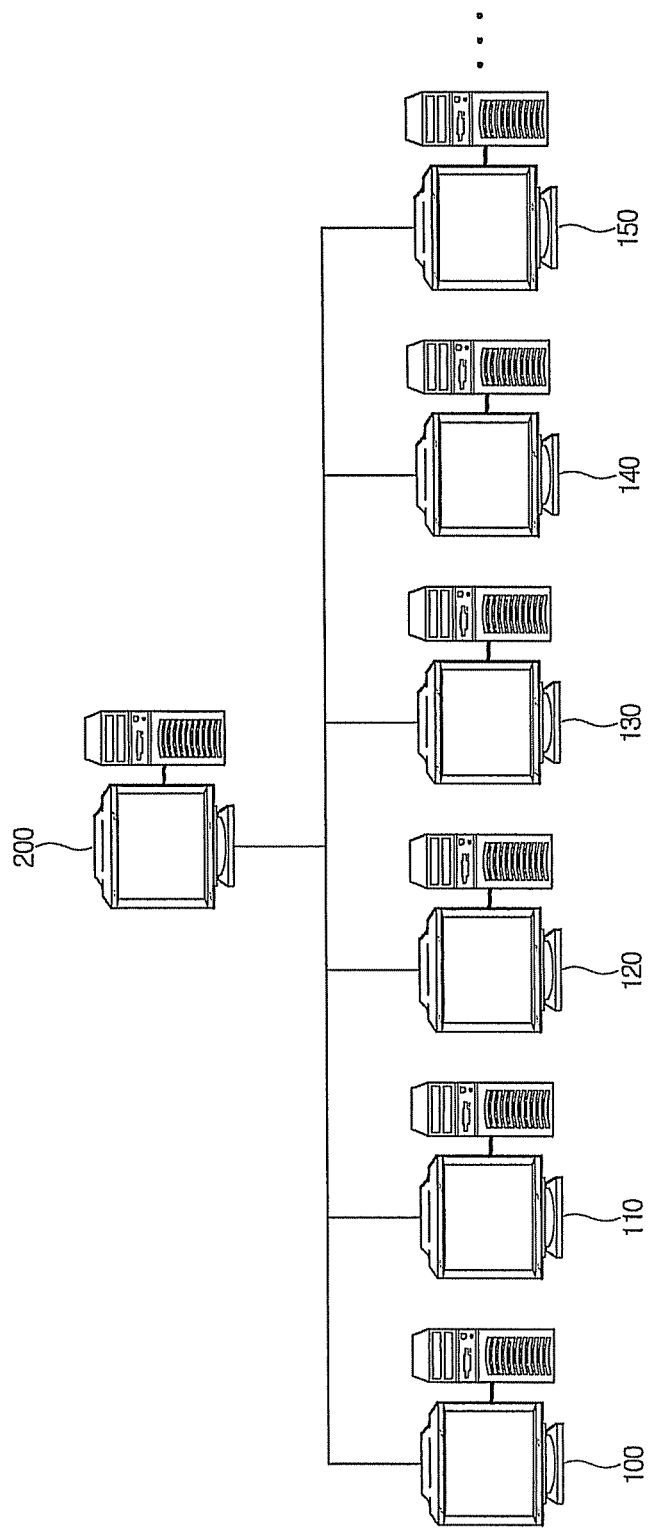
FIG. 1 is a schematic diagram illustrating a remote control system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As illustrated in FIG. 1, a remote control system according to an exemplary embodiment of the present invention may include a plurality of client computers 100, 110, 120, 130, 140, and 150; and a host computer 200 to be connected to the plurality of client computers 100, 110, 120, 130, 140, and 150 through a LAN. The host computer 200 controls the plural client computers 100, 110, 120, 130, 140, and 150 by employing an ASF (Alert Standard Format) technology, an Intel®AMT (Active Management Technology)™, or other control technology. The host computer 200 may control the plural client computers 100, 110, 120, 130, 140, and 150 by transmitting a power on or off signal, a reset signal, an asset signal, a locking signal, an unlocking signal, or other signals. Although reference will hereinafter be made solely to client computer 100, the other client computers 110, 120, 130, 140, and 150 may be similarly configured and may perform similar operations. Further, other aspects of the invention may use any type of device, such as a mobile telephone, a personal digital assistant (PDA), a videogame console, a DVD or other media player, or a portable entertainment device such as the Apple™ iPod™.

Figure 2:
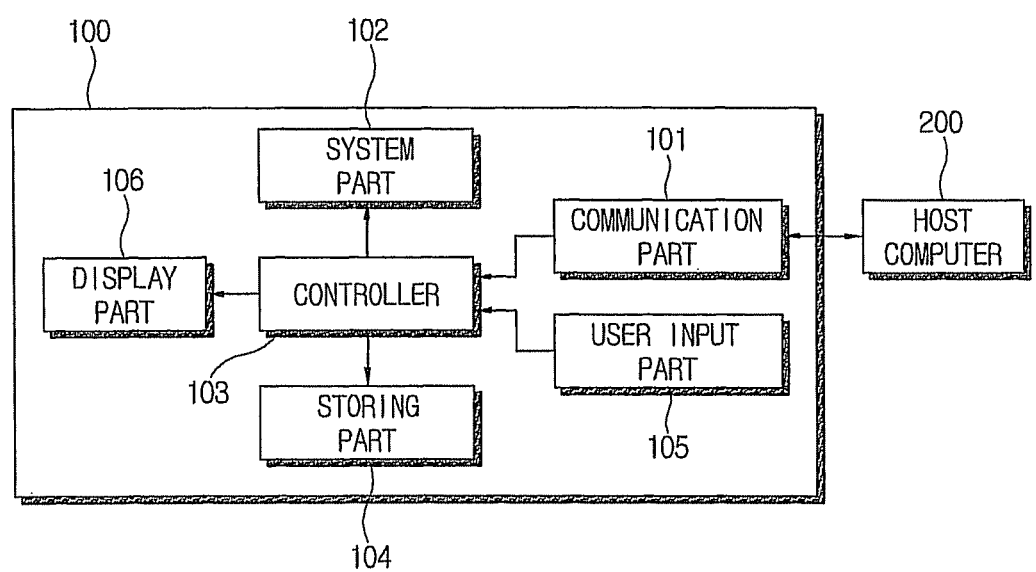
FIG. 2 is a block diagram illustrating a remote control system according to an embodiment of the present invention.

As illustrated in FIG. 2, the client computer 100 according to an aspect of the present invention includes a communication part 101, a system part 102, and a controller 103. The controller 103 controls the communication part 101 and the system part 102. The communication part 101 communicates with the host computer 200. The client computer 100 may receive various control signals from the host computer 200 through the communication part 101. The communication part 101 may include a LAN cable or other cables for a network communication. Other aspects of the present invention may operate over wireless networks.

The system part 102 performs general applications of the client computer 100. Here, the system part 102 is operated according to input from a user via a user input part 105 (to be described later) or according to a command of the host computer 200 received through the communication part 101. For example, the system part 102 may perform a power on or off operation depending on a power supplying signal, a data input or output operation depending on the user input or a control signal, or other operations according to other signals.

The client computer 100 may also include a storing part 104, the user input part 105, a display part 106, or other components. The storing part 104 stores a password as well as the locking signal to stop operating the system part 102 among control signals received from the host computer 200. The storing part 104 may include a flash memory or other types of memory.

Through the user input part 105, a user may select or input a command to control the system part 102 to perform predetermined operations. The user input part 105 may include various input devices having a plurality of input keys, buttons, etc., such as a keyboard or a mouse. In a network system in which the host computer 200 and the client computer 100 are connected to each other, the user input part 105 may also include an input part of a remote system, such as client computers 110, 120, 130, 140, or 150, to control the client computer 100 remotely.

The display part 106, according to operations of the controller 103 to be described later, informs a user that the system part 102 is in a locking state if the client computer 100 receives a user input from the user while the system part 102 is in the locking state. The display part 106 may include a display to display an informing screen, a speaker to output an informing sound, and an LED (Light Emitting Diode) provided at one side of the client computer 100 to generate an informing light.

The controller 103 controls the system part 102 to operate according to a control command received from the host computer 200 or according to a user input. The controller 103 may include a microcomputer, a system BIOS (Basic Input Output System), or other components. If a control signal is received through the communication part 101, the controller 103 controls the system part 102 to be operated according to the received control signal.

In an embodiment of the present invention, the controller 103 controls the storing part 104 to store a locking signal to cease or limit operation of the system part 102 if the locking signal is received from the host computer 200 when the client computer 100, which is turned off, is connected to the host computer 200 by a network.

If a power supplying signal is directly or remotely received from the user input part 105, the controller 103 controls a BIOS (Basic Input Output System) to perform a POST (Power On Self Test) to supply power to the system part 102. The controller 103 may also use other components to supply power to the system part 102. The controller 103 checks whether the locking signal is stored in the storing part 104. If the locking signal is stored in the storing part 104, the controller 103 stops operating the BIOS and controls a power supplying part (not shown) to stop supplying power to the system part 102.

When the locking signal is received through the communication part 101, the controller 103 checks whether the locking signal includes a locking password. If the locking signal includes the locking password, the controller 103 controls the storing part 104 to store the received locking password.

If an unlocking signal to unlock the system part 102 is received, the controller 103 checks whether the unlocking signal includes an unlocking password. Further, if the unlocking signal does include the unlocking password, the controller 103 checks whether the unlocking password is identical to the stored locking password. If the unlocking password is identical to the stored locking password, the controller 103 ends the locking state of the system part 102.

If the locking signal is received from the host computer 200 when the system part 102 is operated, the controller 103 shuts down the system part 102 via a directly or remotely received command. For example, the controller 103 halts or limits operation of the system part 102 via a command received when the system part 102 is put into the locking state. The controller 103 may display an informing screen to inform a user that the system part 102 is presently into the locking state, and then halts or limits operation of the system part 102. The controller 103 may have the display part 106 generate and display a user interface screen, a speaker to output an informing sound, and an LED (Light Emitting Diode) provided in the client computer 100 to generate an informing light, to inform the user that the system part 102 is presently in the locking state. If the locking signal is received from the host computer 200 when the system part 102 is operated, the controller 103 may inform the user that the locking signal is received, and then stop supplying power to the system part 102.

Figure 3:
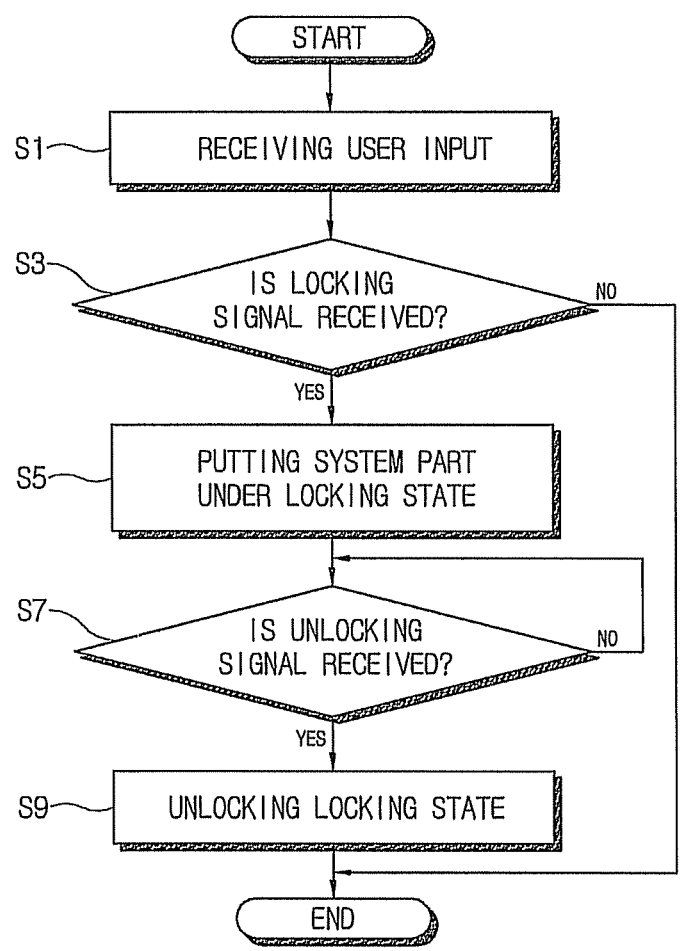
FIG. 3 is a control flowchart illustrating operations of a client computer according to an embodiment of the present invention.

An operation of the client computer 100 that is connected to the host computer 200 by a network according to an embodiment of the present invention will be described with reference to the accompanying diagrams. FIG. 3 is a control flowchart illustrating the client computer 100 according to an aspect of the present invention. First, the client computer 100 directly or remotely receives a user input through the user input part 105 (S1). The controller 103 of the client computer 100 checks whether the system part 102 has received a locking signal from the host computer 200 and, if it has, the locking signal is stored in the storing part 104 (S3). If the received locking signal is stored in the storing part 104, the controller 103 puts the system part 102 into the locking state and stops operation of the system part 102 based on user input (S5).

If an unlocking signal is received while the system part 102 is in the locking state (S7), the controller 103 checks whether the locking signal stored in the storing part 104 includes a first password, whether the unlocking signal includes a second password, and whether the first password is identical to the second password. If the first password is identical to the second password, the controller 103 ends the locking state of the system part 102 (S9), and allows the system part 102 to operate in response to user input.

Figure 4:
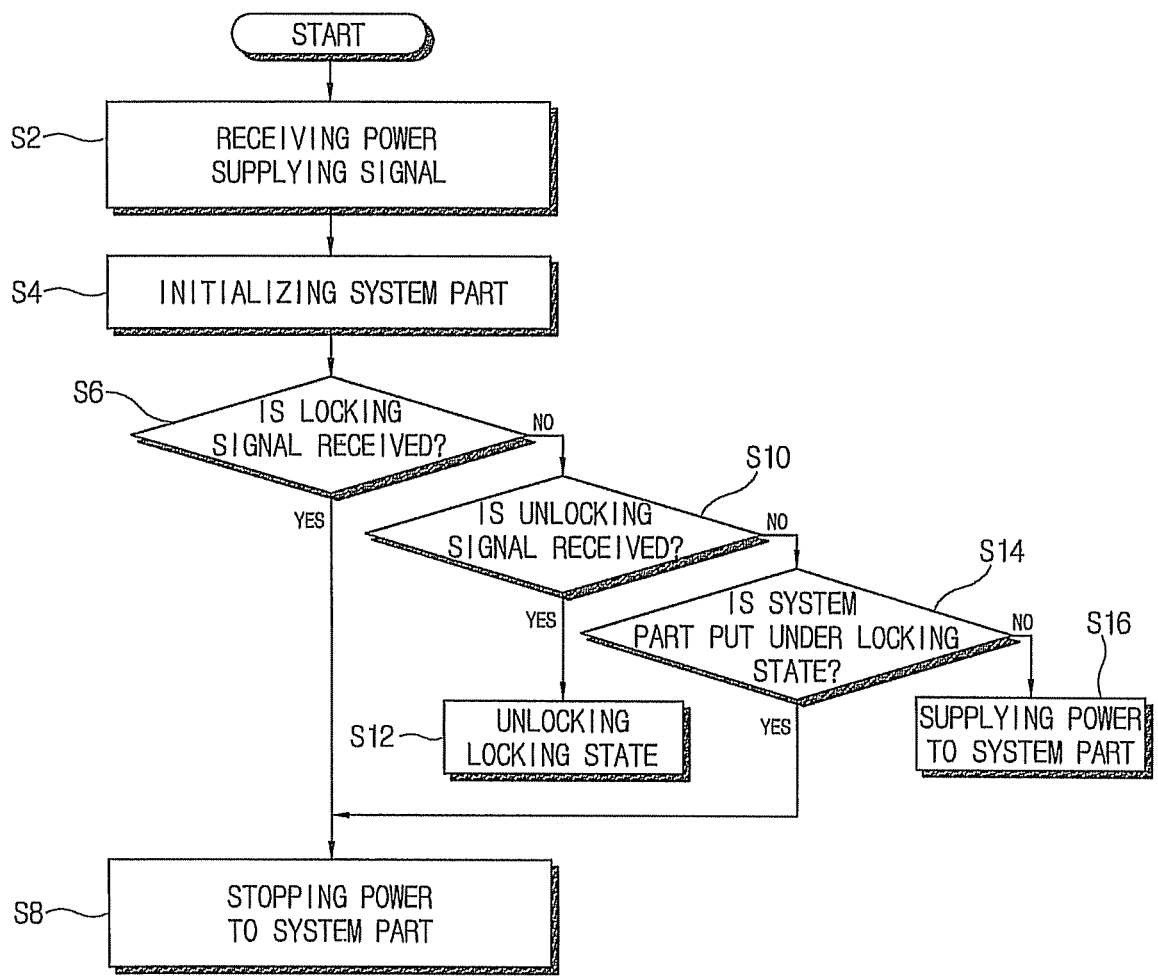
FIG. 4 is a control flowchart illustrating operations of a remote control system according to a first aspect of the present invention.

FIG. 4 is a control flowchart illustrating operations of a remote control system according to a first aspect of the present invention. The client computer 100, which is turned off, is connected to the host computer 200 by the network. First, the client computer 100 receives a power supplying signal to supply power to the system part 102 (S2). Next, the controller 103 initializes the system part 102 by performing a POST to supply power to the system part 102 (S4) and checks whether a locking signal has been received (S6).

If the controller 103 determines that the locking signal has been received, the controller 103 stops performing the POST and stops supplying power to the system part 102 (S8). The controller 103 displays information on the display part 106 to inform a user that the system part 102 is presently in the locking state.

If the controller 103 determines that the locking signal has not been received, the controller 103 checks whether an unlocking signal has been received (S10). If the unlocking signal is received, the controller 103 checks whether the locking signal stored in the storing part 104 includes a first password, whether the unlocking signal includes a second password, and whether the stored first password is identical to the second password. If the stored first password is identical to the second password, the controller 103 ends the locking state of the system part 102 (S12). In operation S10, if the unlocking signal is not received, the controller 102 checks whether the system part 102 is in the locking state (S14). If the system part 102 is not in the locking state, the controller 103 allows the system part 102 to receive power (S16).

Figure 5:
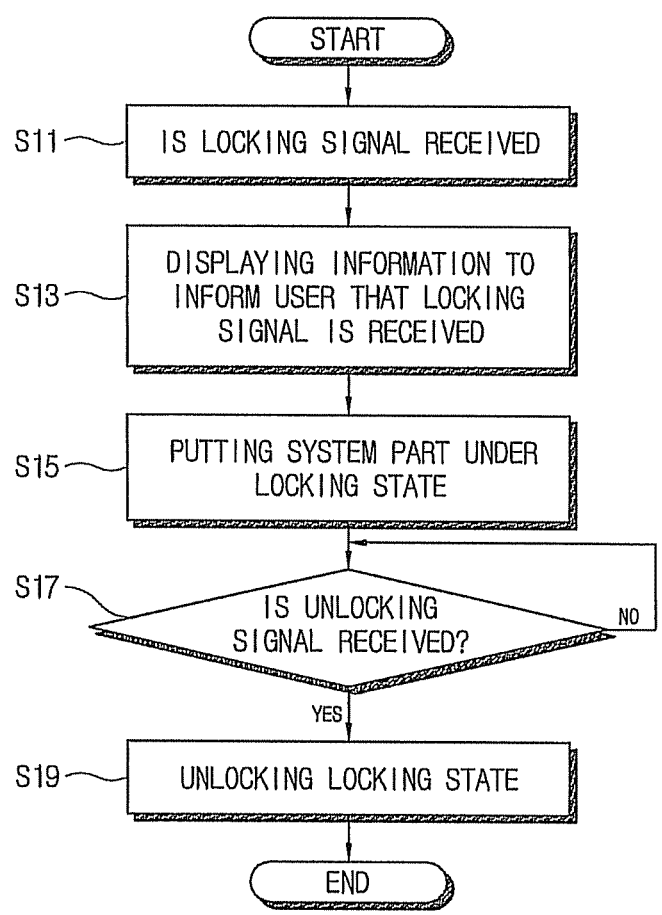
FIG. 5 is a control flowchart illustrating the remote control system according to a second aspect of the present invention.

As illustrated in FIG. 5, in a second aspect of the present invention, if a locking signal is received from the host computer 200 while the client computer is turned on (S11), the controller 103 of the client computer 100 receives the locking signal, then displays information to inform a user that the locking signal has been received (S13). The controller 103 may generate and display a user interface screen on a display, or output an informing sound to a speaker, to inform the user that the locking signal has been received. Then, the controller 103 puts the system part 102 into the locking state (S15).

If the locking signal includes a first password, the controller 103 controls the storing part 104 to store the first password. Further, if an unlocking signal is received from the host computer 200 (S17), the controller 103 checks whether the unlocking signal includes a second password. If the unlocking signal includes the second password, the controller 103 checks whether the stored first password is identical to the second password. If the stored first password is identical to the second password, the controller 103 ends the locking state of the system part 102 (S19).

As described above, aspects of the present invention have been described with respect to the host computer 200 transmitting a locking signal including a first password and an unlocking signal including a second password to the client computer. However, the present invention is not limited thereto. The host computer 200 may transmit a locking signal and an unlocking signal to the client computer 100 without including any passwords to control the client computer 100. The various components of the system may implement any authentication technique to authenticate a locking signal or an unlocking signal.

As is apparent from the above description, according to aspects of the present invention, there is provided a client computer, a remote control system, and a remote control method, which can prevent a client system from being abused by a hacked or disclosed password by shutting down the client system as necessary, to thereby prevent precious information and data from being leaked. Other aspects of the invention may use the locking signal to lock the client computer for any reason, such as the presence of an error in the client computer or to prevent unauthorized use of the client computer.

There is also provided a client computer, a remote control system, and a remote control method, which can allow an unauthorized user or an authorized user, respectively, to be denied access or to be granted access to the client computer by transmitting a locking signal, an unlocking signal, and a password generated in the host computer to the client computer.

Various components of the client computer 100, as shown in FIG. 2, such as controller 130 or communication part 101, may be integrated into a single control unit, or alternatively, can be implemented in software or hardware, such as, for example, a field programmable gate array (FPGA) and an application specific integrated circuit (ASIC). As such, it is intended that the processes described herein to be broadly interpreted as being equivalently performed by software, hardware, or a combination thereof. Software modules can be written via a variety of software languages, including C, C++, or Java. These software modules may include data and instructions which can also be stored on one or more machine-readable storage media, such as dynamic or static read-only memories (EPROMs), electrically erasable and programmable read-only memories (EEPROMs) and flash memories; magnetic disks such as fixed, floppy, and removable disks; other magnetic media including tape; and optical media such as compact discs (CDs) or digital video discs (DVDs). For example, code segments including instructions stored on floppy disks, CD or DVD media, a hard disk, or transported through a network interface card, modem, or other interface device may be loaded into the system and executed as corresponding software routines or modules.

In addition, aspects of the present invention can also be embodied as computer readable codes on a computer readable recording medium. The computer readable recording medium may be any data storage device that can store data which can be thereafter read by a computer system. Examples of a computer readable recording medium also include read-only memory (ROM), random access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A client computer connectable to a host computer by a network, comprising:
   a communication part to communicate with the host computer;
   a display part to display information to a user;
   a system part to perform operations depending on an application; and
   a controller to put the system part into a locking state if a locking signal is received from the host computer through the communication part, and to control the communication part to end the locking state if an unlocking signal is received from the host computer through the communication part,
   wherein the system part does not perform operations in response to user input while the system part is in the locking state, and the controller stops a supply of power to the system part if the locking signal is received, and
   wherein the controller controls the display part to display information indicating that the system part is in a locking state if the client computer receives user input from the user while the system part is in the locking state and while the supply of power to the system part is cut off.

2. The client computer according to claim 1, further comprising:
   a storing part to store passwords received by the client computer,
   wherein the controller checks whether the locking signal comprises a first password if the locking signal is received, and controls the storing part to store the first password if the locking signal comprises the first password, and checks whether the unlocking signal comprises a second password if the unlocking signal is received, compares the second password with the first password if the unlocking signal comprises the second password, and releases the system part from the locking state if the second password is identical to the first password.

3. The client computer according to claim 1, further comprising:
   a power supplying part to supply the power to the system part, wherein the controller controls the power supplying part to stop supplying the power to the system part if the locking signal is received.

4. The client device according to claim 1, wherein the communication part receives the locking signal while the client device is turned off.

5. A remote control system, comprising:
a client computer to be put into a locking state if a locking signal is received from outside, and to be released from the locking state if an unlocking signal is received from the outside; and
a host computer to transmit the locking signal and the unlocking signal to the client computer,
wherein the client computer does not perform functions input by a user while the client computer is in the locking state,
wherein the client computer stops performing a function corresponding to a power supplying signal supplying power to a system part of the client computer if the power supplying signal is received while the client computer is in the locking state, and
wherein the client computer displays information indicating that the client computer is in the locking state if the client computer receives user input from the user while the client computer is in the locking state and while the supply of power to the system part is cut off.

6. The remote control system according to claim 5, wherein:
the host computer transmits the locking signal comprising a first password and the unlocking signal comprising a second password to the client computer; and
the client computer checks whether the locking signal comprises the first password if the locking signal is received and stores the received first password if the locking signal comprises the first password; and checks whether the unlocking signal comprises the second password if the unlocking signal is received, compares the second password with the first password if the unlocking signal comprises the second password, and ends the locking state if the second password is identical to the first password.

7. A remote control method of a host computer and a client computer, comprising:
receiving, by the client computer, a locking signal from the host computer;
putting a system part of the client computer into a locking state wherein the client computer does not perform operations input by a user and a supply of power to the system part is cut off if the locking signal is received;
checking, by the client computer, whether an unlocking signal is received from the host computer;
ending, by the client computer, the locking state of the client computer if the client computer receives the unlocking signal; and
displaying, by the client computer, information indicating that the system part is in a locking state if the client computer receives user input from the user while the system part is in the locking state and while the supply of power to the system part is cut off.

8. The remote control method according to claim 7, further comprising:
generating a first password and transmitting the locking signal comprising the first password to the client computer;
checking whether the locking signal comprises the first password and storing the received first password;

generating a second password and transmitting the unlocking signal comprising the second password to the client computer;
checking whether the unlocking signal comprises the second password and comparing the second password with the stored first password; and
ending the locking state if the second password is identical to the stored first password.

9. The remote control method according to claim 7, wherein the cutting off of the supply of power comprises ceasing an operation corresponding to a power supply signal if the power supply signal is received from the user while the client computer is in the locking state.

10. A method to limit an operation of a client device, comprising:
putting the client device into a locking state in response to a locking signal received by the client device from a host device;
stopping a supply of power to a system part of the client device in response to receiving the locking signal;
displaying information indicating that the system part is in a locking state if the client device receives user input from the user while the system part is in the locking state and while the supply of power to the system part is cut off; and
ending the locking state in response to an unlocking signal received by the client device from the host device,
wherein the client device is operational but does not respond to user input while in the locking state.

11. The method according to claim 10, wherein both the locking signal and the unlocking signal do not have passwords.

12. The method according to claim 10, further comprising: authenticating the locking and unlocking signals.

13. A computer readable medium comprising instructions that, when executed by a client device, perform a method comprising:
putting the client device into a locking state upon receipt of a locking signal from a host computer;
stopping a supply of power to a system part of the client device in response to receiving the locking signal;
displaying information indicating that the system part is in a locking state if the client device receives user input from the user while the system part is in the locking state and while the supply of power to the system part is cut off; and
ending the locking state upon receipt of an unlocking signal,
wherein the client device is operational but does not respond to user input while in the locking state.

14. The computer readable medium according to claim 13, wherein both the locking signal and the unlocking signal do not have passwords.

15. The computer readable medium according to claim 13, further comprising:
authenticating the locking and unlocking signals.

16. A client device comprising:
a controller to put the client device into a locking state if the controller receives a locking signal from a host device connected to the client device via a network and to end the locking state if the controller receives an unlocking signal,
wherein the client device is operational but does not respond to user input while in the locking state,
wherein the controller cuts a supply of power to a system part of the client device if the controller receives the locking signal from the host device, and wherein the controller controls a display part to display information indicating that the system part is in a locking state if the client computer receives user input from the user while the system part is in the locking state and while the supply of power to the system part is cut off.

17. A client computer connectable to a host computer by a network, the client computer comprising:
  a communication part to communicate with the host computer;
  a display part to display information to a user;
  a system part to perform operations depending on an application;
  a storing part to store passwords received by the client computer; and
  a controller to put the system part into a locking state if a locking signal is
  received from the host computer through the communication part, and to control the communication part to end the locking state if an unlocking signal is received from the host computer through the communication part,
  wherein the system part does not perform operations in response to user input while the system part is in the locking state,
  wherein the controller determines whether the locking signal comprises a first password if the locking signal is received, and controls the storing part to store the first password if the locking signal comprises the first password, and determines whether the unlocking signal comprises a second password if the unlocking signal is received, compares the second password with the first password if the unlocking signal comprises the second password, and releases the system part from the locking state if the second password is identical to the first password, and
  wherein the controller controls the display part to display information indicating that the system part is in a locking state if the client computer receives user input from the user while the system part is in the locking state and while the supply of power to the system part is cut off.

* * * * *